United States Patent
Omeragic et al.

(10) Patent No.: US 6,594,584 B1
(45) Date of Patent: Jul. 15, 2003

(54) METHOD FOR CALCULATING A DISTANCE BETWEEN A WELL LOGGING INSTRUMENT AND A FORMATION BOUNDARY BY INVERSION PROCESSING MEASUREMENTS FROM THE LOGGING INSTRUMENT

(75) Inventors: Dzevat Omeragic, Sugar Land, TX (US); Tarek M. Habashy, Danbury, CT (US); Cengiz Esmersoy, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 150 days.

(21) Appl. No.: 09/616,783

(22) Filed: Jul. 14, 2000

Related U.S. Application Data
(60) Provisional application No. 60/160,659, filed on Oct. 21, 1999.

(51) Int. Cl.[7] .............................................. G01N 3/18
(52) U.S. Cl. .............................................................. 702/9
(58) Field of Search .............................. 702/9, 6, 7, 10, 702/11, 14; 703/6, 10; 324/338

(56) References Cited

U.S. PATENT DOCUMENTS

| | | |
|---|---|---|
| 5,210,691 A | 5/1993 | Freedman et al. |
| 5,214,613 A | 5/1993 | Esmersoy |
| 5,230,386 A | 7/1993 | Wu et al. |
| 5,241,273 A | 8/1993 | Luling |
| 5,345,179 A | 9/1994 | Habashy et al. |
| 5,495,174 A | 2/1996 | Rao et al. |
| 5,675,147 A * | 10/1997 | Ekstrom et al. ............ 250/256 |
| 5,703,773 A | 12/1997 | Tabarovsky et al. |
| 5,812,493 A * | 9/1998 | Robein et al. ................ 367/25 |
| 5,886,526 A * | 3/1999 | Wu ............................ 324/338 |
| 6,047,240 A | 4/2000 | Barber et al. |

FOREIGN PATENT DOCUMENTS

EP     2 301 902 A     12/1996

* cited by examiner

*Primary Examiner*—Donald E. McElheny, Jr.
(74) *Attorney, Agent, or Firm*—Victor H. Segura; Brigitte L. Jeffery; John J. Ryberg

(57) ABSTRACT

A method is disclosed for determining a position of a wellbore with respect to layer boundaries in earth formations. The method includes projecting a trajectory of the wellbore onto an initial model of the earth formations, selecting a segment of the trajectory and calculating along the segment expected responses of a well logging instrument. Differences between the expected responses and responses measured by the instrument along the segment are determined. The model is adjusted, the expected responses are recalculated and the differences are again determined. These are repeated until the differences fall below a selected threshold. In one embodiment, the trajectory of the wellbore can be adjusted to remain within a selected distance of a selected one of the layer boundaries.

39 Claims, 2 Drawing Sheets

METHOD FOR CALCULATING A DISTANCE BETWEEN A WELL LOGGING INSTRUMENT AND A FORMATION BOUNDARY BY INVERSION PROCESSING MEASUREMENTS FROM THE LOGGING INSTRUMENT

CROSS REFERENCES

This present application claims the benefit of U.S. Provisional Application No. 60/160,659 filed Oct. 21, 1999.

BACKGROUND OF THE INVENTION

1. Field of the Invention

The invention is related generally to the field of well logging instruments and measurement techniques. More specifically, the invention is related to methods for processing signals from electromagnetic well logging instruments to determine a position of the instrument with respect to a conductivity discontinuity in earth formations surrounding the instrument.

2. Description of the Related Art

Wellbores drilled through earth formations to drain fluids such as petroleum are frequently drilled along a substantially horizontal trajectory in a petroleum reservoir to increase the drainage area in the reservoir. See, for example, MWD resistivity tool guides bit horizontally in thin bed, Oil and Gas Journal Dec. 9, 1991. Because petroleum reservoirs are frequently located in layered earth formations, the position of such substantially horizontal wellbores with respect to the boundaries of the layers in the earth formations often has a material effect on the productivity of such wellbores. Estimation of distances to layer boundaries, therefore, is important for well landing and drain-hole positioning.

Techniques known in the art for estimation of the wellbore position with respect to layer boundaries include those which are indirectly based on well logging measurements in close-by ("offset") wellbores. These techniques assume that the composition and the geometry of the formation layers proximate to the wellbore of interest are substantially the same as in the offset wellbores.

Another group of prior art techniques is based on the observation of features, referred to as "horns", which appear in measurements made by electromagnetic-type well logging instruments, where this type of instrument approaches a layer boundary across which is a large contrast in electrical resistivity. Qualitative estimates of the distance between the instrument and the layer boundary are made by observing the magnitude of the horns.

The techniques known in the art for determining the position of the wellbore with respect to layer boundaries generally rely on well log measurements from a nearby ("offset") well or a "pilot" well. A pilot well is a wellbore drilled substantially vertically through the same earth formations through which a horizontal wellbore is to be drilled. Typically, it is assumed that the layered structure observed in the offset well or pilot well extends to the geographic position of the proposed horizontal wellbore without much variation and without much change in attitude of the layer boundaries. This assumption is often inaccurate, particularly in the case of horizontal wells whose ultimate horizontal extent may be several kilometers from the position of the pilot well or offset well. Further, the prior art technique of observing horns on electromagnetic propagation measurements has several limitations. First, observation of the horns has not proven to be quantitatively accurate. Second, horns are generally observed on the well log only when the instrument is very close to the boundary.

Correction of the wellbore trajectory using horn observation techniques is often too late to avoid penetrating an undesirable layer of the earth formations, such as a water-bearing layer disposed below a hydrocarbon reservoir. The horn observation technique also depends on factors such as having a large resistivity contrast between adjacent layers of the formation, and whether the formation layer boundary is disposed at a "dip" angle suitable for generation of the horns in the resistivity measurements. Anisotropy in the electric conductivity and dielectric permittivity of the layers of the earth formations make the quantitative use of resistivity horns even more difficult.

Techniques known in the art for determining a wellbore trajectory using horn observation, and related techniques, are described, for example, in U.S. Pat. No. 5,241,273 issued to Luling; U.S. Pat. No. 5,495,174 issued to Tao et al; and U.S. Pat. No. 5,230,386 issued to Wu et al. Techniques known in the art for so-called "inversion" processing measurements from well logging instruments are described in a number of patents. See, for example, U.S. Pat. No. 6,047,240 issued to Barber et al; U.S. Pat. No. 5,345,179 issued to Habashy et al; U.S. Pat. No. 5,214,613 issued to Esmersoy; U.S. Pat. No. 5,210,691 issued to Freedman; and U.S. Pat. No. 5,703,773 issued to Tabarovsky et al.

Inversion processing techniques known in the art have as one primary purpose, among others, determining the spatial distribution of physical properties, particularly conductivity, of earth formations surrounding the well logging instrument. Inversion processing generally includes making an initial model of the spatial distribution of formation properties, calculating an expected response of the well logging instrument to the model, and comparing the expected response to the measured response of the logging instrument. If differences between the expected response and the measured response exceed a predetermine threshold, the model is adjusted and the process is repeated until the differences fall below the threshold. The model, after adjustment that results in the reduced differences, then represents a likely distribution of properties of the earth formations.

Inversion processing known in the art is primarily concerned with determining the values of the properties as well as their spatial distribution. It is typically assumed that the properties of the earth formations extend laterally away from the well logging instrument a sufficient distance so that any lateral variations in the formation properties do not materially affect the response of the logging instrument. In cases where this assumption is not true, such as where the well logging instrument axis is highly inclined with respect to various layer boundaries in the formations, improved inversion techniques account for localized instrument response anomalies near these boundaries. Generally, the inversion techniques known in the art, however, do not have as a primary purpose determining the position of the wellbore with respect to layer boundaries.

An inversion processing method described in U.K. published patent application GB 2 301 902 A filed by Meyer discloses determining a distance from a well logging instrument to a layer boundary in an earth formation. The method disclosed in the Meyer '902 A application does not have the capability for determining distances to more than one boundary simultaneously, nor does that method have the capability to determine distances from the layer boundary to the instrument simultaneously at more than one position along the wellbore trajectory.

It is desirable to provide a technique for quantitative estimation of a distance between a well logging instrument disposed in a wellbore and a boundary between layers of earth formations through which the wellbore passes or will eventually pass that is quantitative and does not require the instrument to be very close to any layer boundaries. It is also desirable to provide a technique to quantitatively estimate distances from a well logging instrument to layer boundaries where there is more than one boundary in a layered formation, and over a selected interval or segment of the wellbore, so that the trajectory of the wellbore with respect to the layer boundaries can be more precisely determined.

SUMMARY OF THE INVENTION

The invention provides a method for determining the position of a wellbore with respect to layer boundaries in earth formations. The method includes projecting a trajectory of the wellbore onto an initial model of the earth formations, selecting a segment of the trajectory and calculating, along the segment, the expected responses of a well logging instrument. Differences between the expected responses and the responses measured by the instrument along the segment are determined. The model is adjusted, the expected responses are recalculated and the differences are again determined. These are repeated until the differences fall below a selected threshold.

In one embodiment, the attitude ("dip") of the formation layers with respect to the wellbore trajectory is determined as a result of the process. The wellbore in this embodiment can be extended, using the determined dip, so as to maintain the trajectory within a selected layer of the earth formations.

One embodiment of the invention includes calculating distributions of electric and magnetic fields induced by a transmitter on the instrument at each instrument position along the trajectory segment, and calculating a corresponding receiver response at each instrument position. In this embodiment, the transmitters and receivers are approximated as magnetic dipoles.

In a particular embodiment, the inversion results at least one selected point along the trajectory are calculated to provide a Bayesian minimum uncertainty. This improves the accuracy of the inversion calculations.

DETAILED DESCRIPTION OF SPECIFIC EMBODIMENTS

The invention, in general, is a method for determining a position of a well logging instrument with respect to a bed boundary (formation discontinuity) by inversion processing. Inversion processing generally includes making an initial estimate, or model, of the geometry of earth formations, and the properties of the formations, surrounding the well logging instrument. An expected logging instrument response is calculated based on the initial model. The calculated response is then compared with the measured response of the well logging instrument. Differences between the calculated response and the measured response are used to adjust the parameters of the initial model. The adjusted model is used to again calculate an expected response of the well logging instrument. The expected response for the adjusted model is compared to the measured instrument response, and any difference between them is used to again adjust the model. This process is repeated until the differences between the expected response and the measured response fall below a preselected threshold.

Prior art methods for inversion processing generally calculate the final adjusted model on a "point by point" basis. That is, the model which generates the expected response that most closely matches the measured instrument response is determined at each axial instrument position over which the instrument made measurements in the wellbore. The method of the invention provides an improvement over the methods previously known in the art, which has particular application in maintaining a wellbore within a desired position with respect to layer boundaries in the earth formations. Generally speaking, the method of the invention can be understood as a "multi-point" inversion process, where a model that generates an expected response most closely matching the measured response is determined when the differences between the expected response and the measured response are simultaneously minimized over a segment of the wellbore. The segment of the wellbore includes a plurality of measurement positions.

Figure 1:
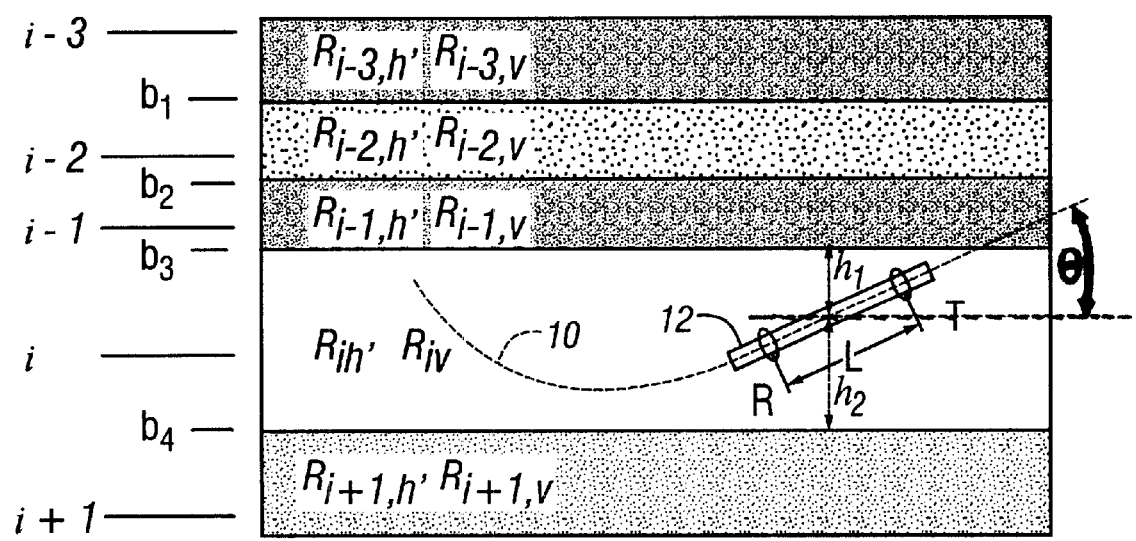
FIG. 1 shows an example of layers of earth formations, through which a wellbore has been drilled.

In one embodiment of the invention, an initial model is developed for use in an inversion process. One example of such an initial model is shown in FIG. 1. Earth formations surrounding a wellbore are shown as a series of layers or strata generally at i−3, i−2, i−1, i, and i+1. Boundaries between contiguous ones of the layers are shown respectively at $b_1$, $b_2$, $b_3$ and $b_4$. In the initial model, physical properties of the individual layers in the model can include, for example, (conductivity) resistivity of each layer, the thickness of each layer, and a selected number of layers above and below the layer of interest. The layer of interest is the layer in which the well logging instrument (12 in FIG. 1) is positioned at any point along the wellbore. One output of the process according to the invention is the distance between the wellbore and the boundaries at any position along the wellbore. The source for the values of layer thickness and resistivity used in the initial model, as will be further explained, can be nearby ("offset") wellbores, for example.

In this embodiment of the invention, some or all of the individual layers can also be electrically anisotropic, meaning that the resistivity as measured in one direction along any one layer is different than the resistivity measured in another direction along the layer. Typical anisotropic earth formation layers have a principal resistivity value measured in a direction along the layer's boundaries, generally known as "horizontal resistivity", and another principal resistivity value measured in a direction perpendicular to the layer's boundaries, generally known as "vertical resistivity". Collectively, the values of the properties for each layer, the thickness of each layer, and the distances from the wellbore to the boundaries are referred to as "parameters".

The initial model parameters can be derived, as previously explained, from measurements made in a wellbore nearby ("offset") the location of the wellbore of interest. Preferably, the measurements from the offset wellbore are made substantially perpendicular to the layer boundaries so that the thicknesses and resistivity values can be more accurately estimated from such measurements. However, measurements made at any inclination can be used with this invention. Using measurements from a nearby wellbore to develop the initial model is not the only means by which the initial model can be developed. Estimation from surface seismic surveys and analysis of drill cuttings from the wellbore of interest are all within the scope of this invention for developing the initial model. The initial model may also be obtained from a "pilot" wellbore. A pilot wellbore is a wellbore drilled substantially perpendicularly to the attitude of the formation layers through which a highly inclined wellbore will ultimately be drilled.

In the initial model according to this embodiment, the layer boundaries are assumed to be substantially parallel to each other and substantially planar. The property of the layers used in this embodiment is resistivity (or its inverse, conductivity). Corresponding resistivity values for each of the layers are shown in FIG. 1 as $R_{i-3,h}$ and $R_{i-3,v}$ for layer i–3; $Ri_{-2,h}$ and $R_{i-2,v}$ for layer i–2; $R_{i-1,h}$ and $R_{i-1,v}$ for layer i–1; $R_{i,h}$ and $R_{i,v}$ for layer i, and $R_{i+1}$, h and $R_{i+1}$, v for layer i+1.

A typical application for this embodiment of the invention would be to determine a distance of the well logging instrument below the top of a petroleum reservoir, and the distance of the well logging instrument above a water contact. In the example model shown in FIG. 1, the top of the reservoir is shown as boundary $b_3$, and the water contact is shown as boundary $b_4$. An example trajectory of a wellbore drilled through some of the various formation layers is shown generally at 10. The trajectory 10 will be explained in more detail.

The well logging instrument 12, in this example, is an electromagnetic (EM) conductivity (resistivity) measuring device. The logging instrument 12 makes measurements related to electrical conductivity of the formation layers either by measuring amplitude and/or phase shift of an electromagnetic field induced in the layers of the formation, or alternatively, by measuring the amplitude and/or phase of signals induced in a receiver R on the instrument generated by electromagnetic induction resulting from eddy currents that flow in the formation. The eddy currents are induced by an electromagnetic field propagated into the formation by a transmitter T on the instrument, and have a magnitude related to the conductivity of the formation layers surrounding the logging instrument. The distance between the transmitter T and the receiver R is shown as L in FIG. 1. Also in FIG. 1, the distance between a selected point along the instrument 12 and the top of the reservoir (boundary $b_3$) is shown as $h_1$, and the distance between the selected point along the instrument 12 and the water contact (boundary$_4$) is shown as $h_2$.

Although the example instrument 12 shown in FIG. 1 includes only the one receiver R and the one transmitter T, in the invention the measurements may involve any selected number of transmitters and receivers, and may also include calculating an expected response of the instrument 12 at various selected operating frequencies. The instrument responses used in this embodiment may also include both induction and propagation-type instruments, and may further include multi-axial measurements and time-domain measurements. For purposes of the explanation which follows, it is assumed that the axes of the transmitter T and receiver R are substantially parallel to the instrument axis. At any position along the trajectory 10, the axis of the instrument 12 is assumed to be substantially parallel to the axis of the wellbore (along the trajectory 10). Consequently, the axes of the transmitter T and receiver R are also parallel to the axis of the trajectory at any instrument position.

When the method of this invention is used with multiple component electromagnetic measurements, the axes of some of the receivers and/or transmitters in such instruments may be oriented in some manner other than parallel to the instrument axis. Appropriate calculation of the response of each such receiver and transmitter in any such well logging instrument can easily be performed using methods well known in the art. Accordingly, the actual orientation of any of the transmitters and receivers used in the calculation according to the invention is not intended to limit the invention. It should also be noted that the transmitter (T in FIG. 1) and the receiver (R in FIG. 1) need not be located in the same one of the layers to perform the method of this invention. If the logging instrument used in any other embodiment of the invention includes multiple transmitters and/or receivers, it should also be noted that it is not required that any of them be disposed in any particular layer in order to perform the method of the invention.

The spatial position of any point along the wellbore trajectory 10 is then determined using measurements made by directional sensors (not shown) which may be disposed in the instrument 12, or by using measurements made by any other type of directional survey instrument known in the art. Methods for calculating the spatial positions of points along the wellbore trajectory 10 from such directional survey measurements are well known in the art. These directional survey measurements, as is also known in the art, are usually referenced with respect to geographic references such as magnetic and/or geographic north and earth's gravity (vertical). Calculating the spatial position of the wellbore trajectory is shown at 20 in FIG. 2.

After the spatial position of points along the trajectory 10 are determined, the points along the trajectory, or the entire trajectory, are then projected onto the initial model. This is shown at 22 in FIG. 2. Each point along the trajectory (10 in FIG. 1), will define a position of a selected point along the instrument 12 with respect to the boundaries above the trajectory ($h_1$ in FIG. 1) and below the trajectory ($h_2$ in FIG. 1), and will define an angle ($\theta$ in FIG. 1) subtended between the instrument axis and the attitude of the layer boundaries. Because the positions of the transmitter T and receiver R along the instrument 12 are known, the spatial positions, with respect to the layer boundaries, of the transmitter T and receiver R at any instrument position along the trajectory 10 are also determinable.

While the example initial model shown in FIG. 1 has boundaries that are horizontal (perpendicular to gravity), it should be clearly understood that any other subtended angle could be used in developing the initial model. Information about the layer attitude ("dip"), however obtained, can also be entered into the initial model, and the subtended angle $\theta$ can be calculated based on the trajectory angle with respect to gravity and the estimate of the dip.

After the trajectory (or individual points) is projected onto the initial model, an expected response of the instrument 12 to the initial model is calculated. This is shown at 24 in FIG. 2. The method for calculating the expected response used in this embodiment is based on the Fourier-Hankel transform for solution of a 1-D layered anisotropic medium. The expected response of the instrument in this embodiment is determined by calculating the spatial distribution of the electric and magnetic fields induced by the transmitter T. The spatial distribution of the electric and magnetic field depends on, among other factors, conductivity, magnetic permeability and dielectric permittivity of each layer, the distances and subtended angle of the transmitter T with respect to the layer boundaries above and below the transmitter T. The spatial distribution of the electric and magnetic fields can be calculated according to the following expressions:

$$\vec{H}(r) = i\omega\left(\varepsilon + \frac{i\sigma}{\omega}\right)\int d\vec{r}\,'\vec{\vec{G}}(\vec{r},\vec{r}\,')\cdot\vec{M}(\vec{r}\,') \quad (1)$$

$$\vec{E}(r) = \int d\vec{r}\,'\vec{\vec{\Gamma}}(\vec{r},\vec{r}\,')\cdot\vec{M}(\vec{r}\,')$$

where $\vec{\vec{G}}(\vec{r},\vec{r}\,')$ and $\vec{\vec{\Gamma}}(\vec{r},\vec{r}\,')$ are magnetic and electric field Green's functions, respectively.

The electric and magnetic field distributions are calculated for selected instrument positions, or for all the instrument 12 positions, along a selected segment (which may have any suitable length) of the trajectory 10. Signals induced in the receiver R are calculated from the electric and magnetic field distributions, and the position and subtended angle of the receiver with respect to the layer boundaries at each of the same instrument positions as is used to calculate the electric and magnetic field distributions. Methods for calculating the receiver responses are known in the art. The responses of the transmitter T and the receiver R are determined, in this embodiment, by approximating each of them as a magnetic dipole.

The expected instrument responses are then compared (26 in FIG. 2) with the responses actually measured by the instrument 12 at all points along the segment of the trajectory. Differences between the expected responses and the measured responses are determined, generally in the aggregate for all the points along the trajectory for which the expected instrument response has been calculated. If the differences fall below a selected threshold (error margin), as shown at 28 and 30 in FIG. 2, then the model is determined to accurately represent the earth formations surrounding the instrument.

Figure 2:
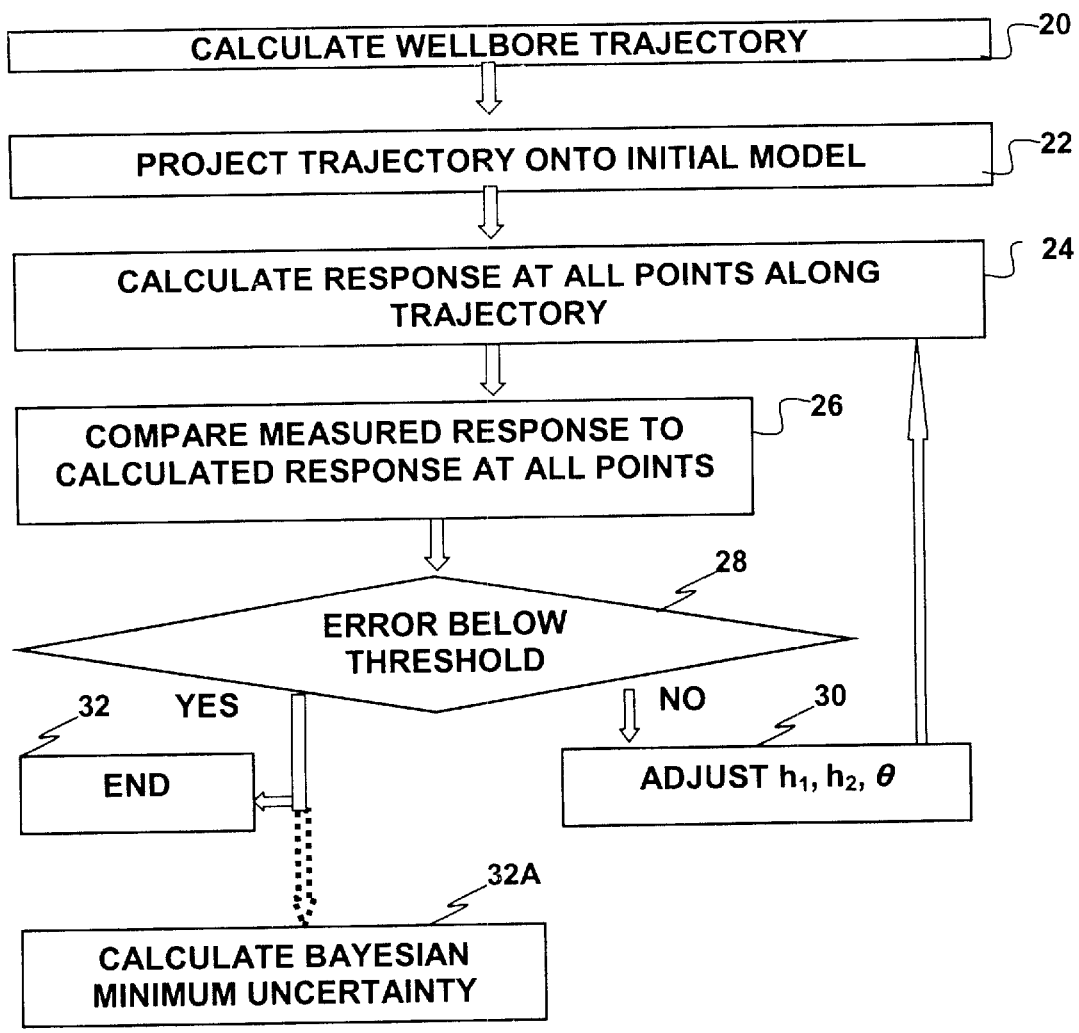
FIG. 2 is a flow chart for one embodiment of the invention.

If the differences exceed the selected threshold, the initial model is then adjusted, as shown at 30 in FIG. 2, and the adjusted model is then used to recalculate the expected instrument response (24 in FIG. 2) along the trajectory segment. Adjusting the model in this embodiment preferably includes adjusting the position of the trajectory with respect to the layer boundaries ($h_1$, $h_2$) and/or changing the subtended angle ($\theta$).

In this embodiment, the expected response of the instrument is calculated along the entire length of the trajectory segment. Preferably the expected response is calculated to the same sample interval as the measurement sample interval of the instrument. As is well known in the art, the measurement sample interval can be either time-based or depth-based depending on the type of instrument used. While this embodiment includes calculating the expected response over the entire segment to the sample interval of the instrument sample interval, it should be clearly understood that the invention contemplates any other expected response calculation interval and contemplates any selected segment length along the trajectory. Factors to consider when deciding how long to make the segment include, among others, calculation time, radial depth of response of the particular logging instrument, and the number of layers in the model.

Calculating the expected response, comparing to the measured response, adjusting the model and recalculating the expected response are repeated until the difference falls below the selected threshold. This inversion process is based on the Gauss-Newton method with adjustable step-length, computed through a line search algorithm. The cost function for the inversion process is defined by the following expression:

$$C(\bar{x}) = \frac{1}{2}\left\|\bar{\bar{W}}_d\cdot\bar{E}(\bar{x})\right\|_2^2 = \frac{1}{2}\cdot\bar{E}'(\bar{x})\cdot\bar{\bar{W}}_d{}'\cdot\bar{\bar{W}}_d\cdot\bar{E}(\bar{x}) \quad (2)$$

where $\bar{x}$ represents the vector of model parameters. The model, as previously explained, may include some or all of the following parameters: distance(s) to boundaries; horizontal and vertical conductivity ($\sigma_h$, $\sigma_v$); and horizontal and vertical dielectric permittivity. ($\epsilon_h$, $\epsilon_v$). $\bar{E}(\vec{x})$ in equation (2) represents the vector of residuals, that is, the difference between the calculated response and the measured response, where:

$$e_j = d_{cj} - d_{mj} \quad (3)$$

$d_{cj}$ and $d_{mj}$ are the calculated and measured instrument responses. The measured responses may include voltage induced in the receiver (R in FIG. 1) whether complex or its magnitude; and/or phase shift or attenuation of the electromagnetic field. $\bar{\bar{W}}_d$ in equation (2) represents the inverse of the data covariance matrix, describing the estimated uncertainties in the available data set due to any noise contamination. It describes estimated variance for each data point as well as the estimated correlation between errors, and may provide weighting of the input data. If detailed information about the measurement noise is missing or is uncertain $\bar{\bar{W}}_d$ is set to an identity matrix, so the cost function becomes simply the sum of square of relative errors.

The inversion according to equation (2) may also be constrained, that is, it can also take into account any prior knowledge of lower and upper limits for distances and/or resistivities and permitivities, by using a suitable transformation of variables. Examples of suitable inversion processes which can be used with the method of the invention are described, for example in, W. H. Press, S. A. Teukolski, W. T. Vetterling, B. P. Flannery: "Numerical recipes in C, The art of scientific computing", 2nd edition, Cambridge University Press, Cambridge, Mass., 1992. and in, J. E. Dennis, R. B. Schnabel, "Numerical methods for unconstrained optimization and nonlinear equations", SIAM Classics in Applied Mathematics, 16, Prentice-Hall, Inc., Englewood Cliffs, N.J., 1983.

One result of the inversion process according to this embodiment is a set of values representing, at each point along the trajectory segment, distances between layer boundaries above and below the trajectory (10 in FIG. 1), and the angle subtended ($\theta$) between the trajectory axis and the layer boundaries. The distances and/or subtended angle values can be further used, by combining the trajectory with the calculated distances and/or angle to calculate an estimate of the attitude ("dip") of the layer boundaries with respect to a geographic reference.

Because the inversion process according to the invention simultaneously minimizes differences between expected and measured responses at a plurality of positions along the wellbore trajectory, the accuracy with which the distances is determined is greatly improved over methods previously known in the at which relied on point-to-point determination of instrument response. By determining the expected dip of the layer boundaries and distances between the wellbore and the layer boundaries, the accuracy with which the trajectory can be maintained within a selected layer of the formation can also be improved using the method of the invention. This is performed by adjusting the inclination of the trajectory to match the attitude of the boundaries of the layer in which the wellbore trajectory is to be maintained.

Further improvement to the results obtained using the inversion processing method of the invention can be obtained by a Bayesian processing technique. The distance-to-boundary inversion process of the previous embodiment of the invention is based on Newton-Gauss least-square minimization using a line search algorithm. The results of this inversion, as previously explained, can include distance (s) to the boundary and/or anisotropic conductivities $\sigma_h$, $\sigma_v$ and dielectric permittivities $\epsilon_h$ and $\epsilon_v$.

Least-square minimization is a maximum likelihood estimator for the fitted parameters, if measurement errors are uncorrelated and are normally distributed with a constant standard deviation. It is assumed for purposes of this explanation that the measurement data distribution is approximately normal, and that measurement error is statistical (random), not including any systematic error. The result of each inversion also includes uncertainties that can be derived from a covariance matrix, which is the inverse of the system matrix $C=(J^T \cdot J)^{-1}$, where J represents the Jacobian matrix. The square root of diagonal element $c_{ii}$ of the covariance matrix represents the uncertainty of the ith parameter in the matrix.

Bayesian post processing according to this embodiment of the invention is intended to reduce uncertainties in the result. Bayes's rule provides a relationship between prior probability density functions ("pdf"), a likelihood function and a posterior pdf. This relationship makes it possible to quantify the final uncertainty in the parameters of interest. The posterior pdf can be determined by the expression:

$$L(x|d) \, p(x) L(x,d) \tag{4}$$

Where p(m) represents the prior pdf (what is known about the measurement data), p(x|d) represents the posterior pdf, and L(m|d) is the likelihood function which can be determined by the following expression:

$$L(x|d) \propto \exp\left\{-\frac{1}{2\sigma_e^2} \sum_{i=1}^{N} [d_i - g_i(x)]^2\right\} \tag{5}$$

where m represents the model parameters, d represent the measurements made by the logging instrument, and where g represents the expected instrument response for the selected model parameters, x.

The composite uncertainty for a sequence of data values $d_1, d_2, \ldots, d_N$, can be derived by the expression:

$$L(x|d_1, d_2, \ldots, d_N) = L(x|d_1) L(x|d_2) \ldots L(x|d_N) \tag{6}$$

Applying Bayes' rule to the inversion process according to the invention can be explained as follows. If the boundary position determined from the ith inversion step is located at position $x_1$, then the likelihood is defined by the expression:

$$L(x|d_i) = e^{-\frac{(x-x_i)^2}{2\sigma_i^2}} \tag{7}$$

where $\sigma_i$ represents the uncertainty for corresponding data set $d_i$. For a sequence of N inversion steps, the composite uncertainty is defined by the expression:

$$L(x|d_1, d_2, \ldots, d_N) = e^{-\frac{(x-x^*)^2}{2\sigma^{*2}}} \tag{8}$$

where $$\frac{1}{\sigma^{*2}} = \sum_{i=1}^{N} \frac{1}{\sigma_i^2}, \; x^* = \frac{1}{\sigma^{*2}} \sum_{i=1}^{N} \frac{x_i}{\sigma_i^2}. \tag{9}$$

When applied to distance to boundary inversion results as described in the previous embodiment, this processing focuses the solution, as expected. All available data points preferably should be used in Bayesian processing. The data processed using the Bayesian post processing corresponds to single point inversion. A small uncertainty (accurate prior) near the boundary has been shown to provide excellent accuracy of determination of the trajectory with respect to a layer boundary even at a distance of 12' from the layer boundary. Bayesian uncertainty minimization is shown in the flow chart of FIG. 2 at 32A.

It is known in the art to use the position of the wellbore with respect to layer boundaries to adjust the trajectory of the wellbore as the wellbore is extended (drilled further) into the earth formations. See, for example, U.S. Pat. No. 5,241,273 issued to Luling. A useful application for the method of this invention is to enable the wellbore operator to adjust the trajectory of the wellbore to maintain a selected wellbore position with respect to any one or more particular layer boundaries in the earth formations. Such boundaries may include, for example, a gas/water contact within a gas bearing formation. The wellbore drilling can be resumed along the adjusted trajectory using directional drilling techniques well known in the art.

The invention has been described with reference to particular embodiments. Those skilled in the art will appreciate that other embodiments of the invention can be derived which do not depart from the scope of the invention as described herein. Accordingly, the invention shall be limited in scope only by the attached claims.

What is claimed is:

1. A method for determining a position of a wellbore with respect to layer boundaries in earth formations, comprising:
   projecting a trajectory of the wellbore onto an initial model of the earth formations;
   calculating expected responses of a well logging instrument along a selected segment of the trajectory;
   determining differences between the expected responses and responses measured by the instrument simultaneously at a plurality of instrument positions along the segment; and
   adjusting the model, recalculating the expected responses and determining the simultaneous differences until the simultaneous differences fall below a selected threshold.

2. The method as defined in claim 1 wherein the adjusting comprises changing at least one parameter selected from the group or angle between layer boundary attitude and trajectory axis, distance between the logging instrument and a selected layer boundary above the instrument, distance between the logging instrument and a selected layer boundary below the instrument, and resistivity of a nearby layer.

3. The method as defined in claim 1 wherein the adjusting comprises changing at least one parameter selected from the group of horizontal conductivity, vertical conductivity, horizontal dielectric constant and vertical dielectric constant.

4. The method as defined in claim 1 further comprising calculating an attitude of the layer boundaries with respect to a geographic reference.

5. The method as defined in claim 1 further comprising extending the wellbore to maintain the trajectory at a selected position with respect to at least one layer boundary of the earth formations.

6. The method as defined in claim 1 wherein the trajectory is determined by calculation from orientation measurements made by the well logging instrument.

7. The method as defined in claim 1 wherein the initial model is developed by measurements made in an offset wellbore near the location of the wellbore.

8. The method as defined in claim 1 wherein the well logging instrument measures electromagnetic induction response of the earth formations.

9. The method as defined in claim 1 wherein the well logging instrument measures electromagnetic propagation response of the earth formations.

10. The method as defined in claim 1 wherein the determining the differences and adjusting the model is performed using Gauss-Newton inversion based on a line search algorithm.

11. The method as defined in claim 1 wherein the calculating the instrument responses comprises calculating distributions of an electric field and a magnetic field induced by a transmitter at selected positions along the trajectory segment, and calculating for corresponding positions along the trajectory, a response of a receiver, the transmitter and receiver each approximated by a magnetic dipole.

12. The method as defined in claim 1 wherein layer boundaries in the initial model are substantially planar and parallel to each other.

13. The method as defined in claim 1 further comprising determining a Bayesian minimum uncertainty for at least one selected position along the trajectory.

14. A method for determining a position of a wellbore with respect to layer boundaries in earth formations, comprising:
projecting a trajectory of the wellbore onto an initial model of the earth formations;
selecting a segment of the trajectory and calculating therealong expected responses of a well logging instrument;
determining differences between the expected responses and responses measured by the instrument simultaneously at a plurality of instrument positions along the segment; and
adjusting the model, recalculating the expected responses and determining the simultaneous differences until the simultaneous differences fall below a selected threshold, the adjusting comprising changing at least one parameter selected from the group of angle between layer boundary attitude and trajectory axis, distance between the logging instrument and a layer boundary above the instrument, and distance between the instrument and a layer boundary below the instrument, the calculating the differences and adjusting the model performed using Gauss-Newton inversion based on a line search algorithm.

15. The method as defined in claim 14 further comprising calculating an attitude of the layer boundaries with respect to a geographic reference.

16. The method as defined in claim 14 wherein the adjusting further comprises changing at least one parameter selected from the group of horizontal conductivity, vertical conductivity, horizontal dielectric constant and vertical dielectric constant, and resistivity of a nearby layer.

17. The method as defined in claim 14 further comprising extending the wellbore to maintain the trajectory at a selected position with respect to at least one layer boundary of the earth formations.

18. The method as defined in claim 14 wherein the trajectory is determined by calculation from orientation measurements made by the well logging instrument.

19. The method as defined in claim 14 wherein the initial model is developed by measurements made in an offset wellbore near the location of the wellbore.

20. The method as defined in claim 14 wherein layer boundaries in the initial model are substantially planar and parallel to each other.

21. The method as defined in claim 14 further comprising determining a Bayesian minimum uncertainty for at least one position along the trajectory.

22. The method as defined in claim 1 wherein tho well logging instrument includes at least one transmitter or receiver comprising a plurality of antennas having non-parallel axes.

23. The method as defined in claim 1 wherein the responses measured by the well logging instrument include time domain measurements.

24. The method as defined in claim 1 wherein the formation model comprises two earth layers and the adjusting comprises changing at least one parameter selected from the group of angle between layer boundary attitude and trajectory axis, distance between the logging instrument and a selected layer boundary, horizontal conductivity, vertical conductivity, horizontal dielectric constant, and vertical dielectric constant.

25. The method as defined in claim 1 wherein the formation model comprises three earth layers and the adjusting comprises changing at least one parameter selected from the group of angle between layer boundary attitude and trajectory axis, distance between the logging instrument and a selected layer boundary above the instrument, distance between the logging instrument and a selected layer boundary below the instrument, horizontal conductivity, vertical conductivity, horizontal dielectric constant, and vertical dielectric constant.

26. The method as defined in claim 14 wherein the well logging instrument measures electromagnetic induction response of the earth formations.

27. The method as defined in claim 14 wherein the well logging instrument measures electromagnetic propagation response of the earth formations.

28. The method as defined in claim 14 wherein the well logging instrument includes at least one transmitter or receiver comprising a plurality of antennas having non-parallel axes.

29. The method as defined in claim 14 wherein the responses measured by the well logging instrument include time domain measurements.

30. The method as defined in claim 14 wherein the calculating the instrument responses comprises calculating distributions of an electric field and a magnetic field induced by a transmitter at selected positions along the trajectory segment, and calculating for corresponding positions along the trajectory, a response of a receiver, the transmitter and receiver each approximated by a magnetic dipole.

31. A system for determining a position of a wellbore, or a logging instrument disposed within the wellbore, with respect to a layer boundary in an earth formation, comprising:
a logging instrument having at least one transmitter antenna to transmit electromagnetic energy and at least one receiver antenna to receive electromagnetic energy;
a processor adapted to process signals received at the at least one receiver antenna;
said processor adapted to project a trajectory of the wellbore onto an initial model of the earth formation;
said processor adapted to calculate responses of the logging instrument along a selected segment of the trajectory;
said processor adapted to determine differences between the expected responses and responses measured by the instrument simultaneously at a plurality of instrument positions along the segment; and
said processor adapted to adjust the model, recalculating the expected responses and determining the simultaneous differences until the simultaneous differences fall below a selected threshold.

32. The system of claim 31, wherein the at least one transmitter antenna is disposed on said instrument with its axis at an angle with respect to the instrument axis.

33. The system of claim 31, wherein the at least one receiver antenna is disposed on said instrument with its axis at an angle with respect to the instrument axis.

34. The system of claim 31, wherein the at least one receiver antenna and the at least one transmitter antenna are each disposed on said instrument with their respective axes at an angle with respect to instrument axis.

35. The system of claim 31, wherein said processor is adapted to manipulate at least one parameter selected from the group of angle between layer boundary attitude and trajectory axis, distance between the logging instrument and a selected layer boundary above the instrument, distance between the logging instrument and a selected layer boundary below the instrument, and resistivity of a nearby layer.

36. The system of claim 31, wherein said processor is adapted to manipulate at least one parameter selected from the group of horizontal conductivity, vertical conductivity, horizontal dielectric constant and vertical dielectric constant.

37. The system of claim 31, wherein said processor is adapted to calculate an attitude of a layer boundary with respect to a geographic reference.

38. The system of claim 31, wherein the logging instrument measures an electromagnetic induction response of the earth formation.

39. The system of claim 31, wherein the logging instrument measures an electromagnetic propagation response of the earth.

* * * * *